(12) United States Patent
Ye et al.

(10) Patent No.: US 10,603,744 B2
(45) Date of Patent: Mar. 31, 2020

(54) AIMING BEAM SIDE-COUPLER

(71) Applicant: Lumentum Operations LLC, Milpitas, CA (US)

(72) Inventors: Changgeng Ye, Milpitas, CA (US); Hongbo Yu, San Jose, CA (US); Martin H. Muendel, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/213,616

(22) Filed: Dec. 7, 2018

(65) Prior Publication Data

US 2019/0193196 A1  Jun. 27, 2019

Related U.S. Application Data

(60) Provisional application No. 62/607,108, filed on Dec. 18, 2017.

(51) Int. Cl.
| | |
|---|---|
| *G02B 6/26* | (2006.01) |
| *B23K 26/035* | (2014.01) |
| *C03C 25/105* | (2018.01) |
| *G02B 6/28* | (2006.01) |
| *C03C 25/12* | (2006.01) |

(52) U.S. Cl.
CPC .......... *B23K 26/035* (2015.10); *C03C 25/105* (2013.01); *C03C 25/12* (2013.01); *G02B 6/2821* (2013.01)

(58) Field of Classification Search
CPC ...... G02B 6/26; G02B 6/262; G02B 6/12007; G02B 6/4214; G02B 6/43
See application file for complete search history.

(56) References Cited

U.S. PATENT DOCUMENTS

| 6,826,335 B1 | 11/2004 | Grudinin et al. | |
| 2016/0187608 A1* | 6/2016 | Brown | G01M 11/37 356/73.1 |
| 2018/0188080 A1* | 7/2018 | Waisman | A61B 1/07 |

\* cited by examiner

*Primary Examiner* — Jennifer Doan
(74) *Attorney, Agent, or Firm* — Harrity & Harrity, LLP

(57) ABSTRACT

A method of manufacturing a side-coupling structure, associated with coupling an aiming beam from an aiming beam fiber into a laser beam fiber, may include removing a coating from a section of the laser beam fiber and removing a coating from a section of the aiming beam fiber. The method may further include bringing the section of the aiming beam fiber in physical contact with the section of the laser beam fiber in order to create the side-coupling structure. The method may further include recoating the section of the laser beam fiber and the section of the aiming beam fiber in order to coat the side-coupling structure.

22 Claims, 5 Drawing Sheets

AIMING BEAM SIDE-COUPLER

RELATED APPLICATION

This application claims priority under 35 U.S.C. § 119 to U.S. Provisional Patent Application No. 62/607,108, filed on Dec. 18, 2017, the content of which is incorporated by reference herein in its entirety.

TECHNICAL FIELD

The present disclosure relates to an optical coupler and, more specifically, to an optical coupler for coupling an aiming beam (e.g., a beam of light at a wavelength in the visible spectrum) from an aiming beam fiber to a laser beam fiber in order to facilitate aiming of a laser output of a fiber laser.

BACKGROUND

A fiber laser is a laser in which an active gain medium is an optical fiber doped with an element capable of providing gain, such as erbium, ytterbium, neodymium, dysprosium, praseodymium, thulium, holmium, bismuth, and/or the like. In operation of a fiber laser, output laser light is typically coupled through an optical delivery fiber, thereby allowing light to be readily delivered to a movable focusing element, which is important when a laser output of the fiber laser is to be used in, for example, a material processing application (e.g., cutting, welding, engraving, marking, and/or the like). In many applications, it is useful to provide a low-power visible aiming beam delivered through the same optical delivery fiber, thereby enabling the user to adjust the beam position through the output optics and/or on the workpiece before operating the fiber laser.

SUMMARY

According to some implementations, a method of manufacture may include removing a coating from a section of a laser beam fiber; removing a coating from a section of an aiming beam fiber; bringing the section of the aiming beam fiber in physical contact with the section of the laser beam fiber in order to create a side-coupling structure, associated with coupling an aiming beam from the aiming beam fiber into the laser beam fiber; and recoating the section of the laser beam fiber and the section of the aiming beam fiber in order to coat the side-coupling structure.

According to some implementations, an optical coupler may include a primary fiber including a primary window stripped section; a secondary fiber including a secondary window stripped section, wherein the secondary window stripped section is in physical contact with the primary window stripped section in order to create a side-coupling structure for coupling a secondary beam, associated with the secondary fiber, to the primary fiber; and a coating surrounding the primary window stripped section and the secondary window stripped section.

According to some implementations, an optical coupler may include a first fiber for a laser beam, wherein the first fiber includes a first coating surrounding a first cladding surrounding a first core, and wherein the first fiber includes a first section with the first coating removed; a second fiber for an aiming beam, wherein the second fiber includes a second coating surrounding a second core, wherein the second fiber includes a second section with the second coating removed, and wherein the second section is in physical contact with the first section for coupling the aiming beam from the second fiber into the first fiber; and a third coating surrounding the first section and the second section, wherein the third coating surrounds segments of the first coating adjacent to ends of the first section and segments of the second coating adjacent to ends of the second section.

DETAILED DESCRIPTION

The following detailed description of example implementations refers to the accompanying drawings. The same reference numbers in different drawings may identify the same or similar elements.

A fiber laser may operate in a spectral region that is outside of the visible spectrum and thus is invisible to the human eye. For example, an ytterbium-doped fiber laser operates at a wavelength of approximately 1 micron (μm), which is invisible to the human eye. This can be problematic when the fiber laser is to be used in a material processing application (e.g., cutting, engraving, marking, welding, and/or the like), since a laser output needs to be aimed to a desired location during the material processing. Here, since the laser output is not visible to the human eye, accurate aiming of the laser output is difficult or impossible. In order to address this issue, a low-power laser in the visible spectrum (herein referred to as an aiming beam) can be coupled to a laser beam fiber so that the laser output includes the laser beam and at least a portion of the aiming beam. Here, the portion of the aiming beam causes the laser output to be visible, thereby enabling aiming.

In some cases, coupling the aiming beam to the laser beam fiber can be achieved using free space optics. In such a case, the laser beam and the aiming beam, both in free space, are collimated by one or more lenses, and a dichroic mirror is used to combine the aiming beam and the laser beam. Another lens then focuses the combined beam back into a laser beam fiber. However, the free space optics approach is complex and difficult to manufacture since multiple free space optical components need to be arranged and aligned with a high degree of accuracy. Furthermore, the free space optics approach is optically inefficient and, therefore, is not desirable in practice.

In some cases, coupling the aiming beam to the laser beam fiber can be achieved using a fused fiber combiner. In such a case, an aiming beam fiber and a laser beam fiber are heated while being stretched in order to create fibers that are fused together. In operation, an aiming beam can be coupled to the laser beam fiber through a region in which the aiming beam fiber and the laser beam fiber are fused together. However, a fused fiber combiner is complex and difficult to manufacture since, for example, heating and tapering need to be performed. Furthermore, the heat-treatment and tapering required to create a fused fiber combiner causes power loss, beam quality degradation, and heating problems, thereby degrading performance of the fiber laser. For example, heat treatment or other perturbation to a core of the laser beam fiber (where the high-power laser is confined) may result in power loss to the laser beam, which is critical, particularly in the case of a kilowatt (kW) fiber laser.

Some implementations described herein provide an optical coupler associated with coupling an aiming beam from an aiming beam fiber into a laser beam fiber, and a method of manufacturing such an optical coupler. This optical coupler is herein referred to as a side-coupling structure. The side-coupling structure is comparatively less complex and less difficult to manufacture (e.g., as compared to the free space optics and fused fiber combiner approaches described above).

Further, as described below, manufacture of the side-coupling structure does not require heating or fusion (which is required in the case of a fused fiber combiner), thereby preventing power loss, beam quality degradation, heating problems, and/or the like, that can result from heating or fusion processes.

Furthermore, as described below, the side-coupling structure allows for cladding-to-core coupling of the aiming beam (e.g., such that the aiming beam is confined to a core of a tertiary fiber associated with outputting the laser beam, such as a feeding fiber), which makes the aiming beam co-propagating with the laser signal beam in the same fiber core, so that aiming beam can better represent the laser signal beam orientation and divergence, and can avoid cladding transmission loss induced by the cladding light stripper downstream. Further, in some implementations, the side-coupling structure allows for the aiming beam to make multiple passes, which can result in increased coupling efficiency, as described below.

Figure 1A:
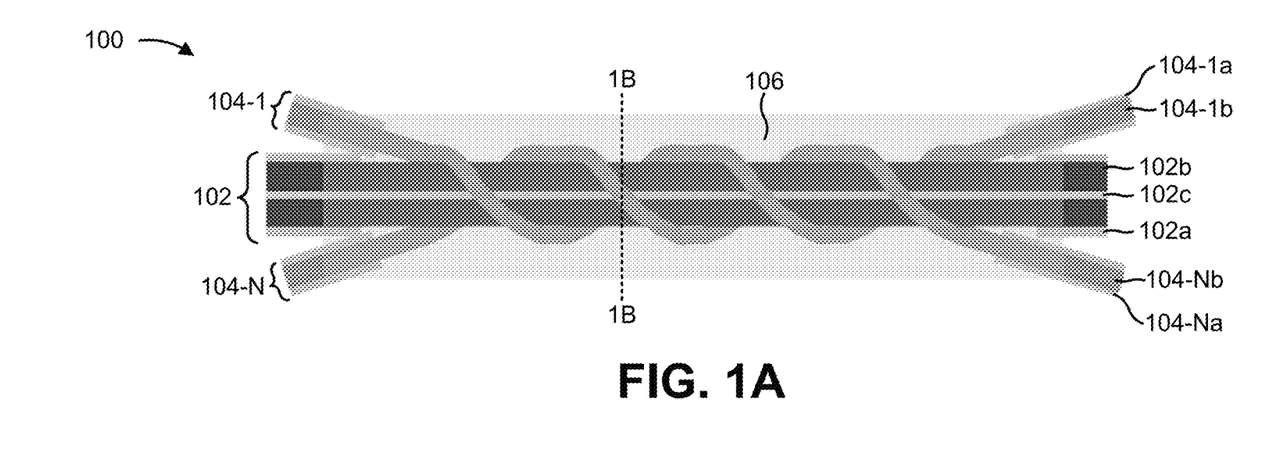
FIGS. 1A-1C are diagrams of an example side-coupling structure associated with coupling an aiming beam from an aiming beam fiber into a laser beam fiber, as described herein.
Figure 1B:
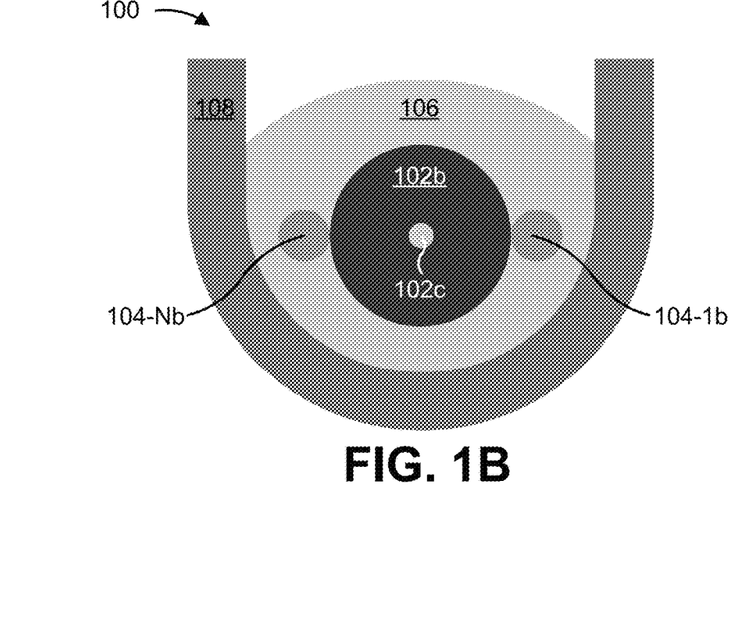
Figure 1C:
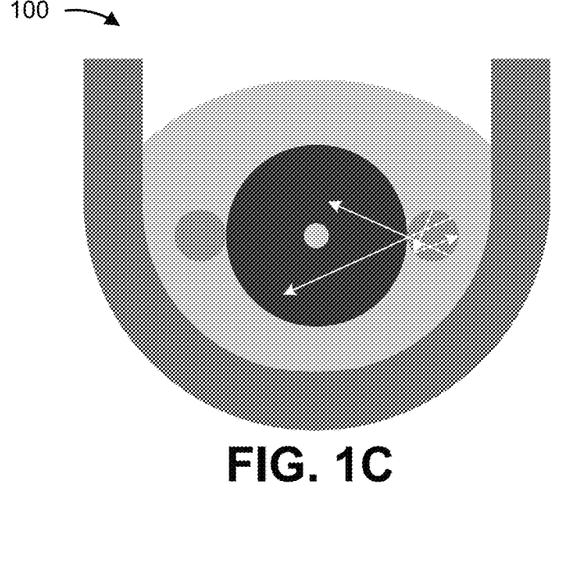

FIGS. 1A-1C are diagrams of an example side-coupling structure 100 associated with coupling an aiming beam from an aiming beam fiber into a laser beam fiber, as described herein.

As shown in FIG. 1A, side-coupling structure 100 may include a laser beam fiber 102, one or more aiming beam fibers 104 (e.g., aiming beam fiber 104-1 through aiming beam fiber 104-N (N≥1)), and a coating 106.

Laser beam fiber 102 (sometimes referred to herein as a primary fiber or a first fiber) is an optical fiber capable of transmitting signal light (rather than pump light) associated with a fiber laser system. In some implementations, laser beam fiber 102 may propagate a laser beam (e.g., a high-power beam associated with a kW fiber laser, sometimes referred to herein as a primary beam) that is to be used in a material processing application, such as cutting, welding, engraving, marking, and/or the like. As shown, laser beam fiber 102 is a fiber (e.g., a double-clad fiber) comprising a coating 102a (e.g., a low-index polymer coating), a cladding 102b (e.g., a cladding to confine laser light), and a core 102c (e.g., a core to transmit the laser light). In some implementations, a size (e.g., a diameter) of core 102c may be in a range from approximately 8 μm to approximately 100 μm, such as 30 μm. In some implementations, a size (e.g., a outer diameter) of cladding 102b may be in a range from approximately 125 μm to approximately 1200 μm, such as 600 μm. In some implementations, a size (e.g., an outer diameter) of coating 102a may be in a range from approximately 250 μm to approximately 1500 μm, such as 700 μm. Aiming beam fiber 104 (sometimes referred to herein as a secondary fiber or a second fiber) is an optical fiber capable of transmitting aiming light (e.g., a comparatively lower power beam in the visible spectrum). In some implementations, aiming beam fiber 104 may propagate an aiming beam that is to be coupled to laser beam fiber 102. In some implementations, coupling the aiming beam to laser beam fiber 102 facilitates aiming of the laser beam (e.g., since a laser output will include light in the visible spectrum). As shown, a given aiming beam fiber 104 includes a coating 104a and a core 104b (e.g., aiming beam fiber 104-1 includes a coating 104-1a and a core 104-1b, aiming beam fiber 104-N includes a coating 104-Na and a core 104-Nb). In some implementations, a size (e.g., a diameter) of core 104b may be in a range from approximately 80 μm to approximately 400 μm, such as 125 μm. In some implementations, a size (e.g., an outer diameter) of coating 104a may be in a range from approximately 100 μm to approximately 600 μm, such as 250 μm. Notably, aiming beam fiber 104 may not include a glass cladding layer (e.g., an optical fiber including only a glass core and a coating that is preferably a low-index polymer, thereby serving as a wave-guiding cladding with respect to the core). In some implementations, the size (e.g., cross-sectional area) of aiming beam fiber 104 may be less than or equal to approximately one-half of the size of laser beam fiber 102 (e.g., in order to cause a portion of the aiming beam power in laser beam fiber 102 to be greater than aiming beam power in aiming beam fiber 104 after coupling through side-coupling structure 100).

As shown in FIG. 1A, coating 102a of laser beam fiber 102 is removed from a section of laser beam fiber 102. Similarly, coating 104a is removed from a section of aiming beam fiber 104. In other words, in side-coupling structure 100, coating 102a and coating 104a are not present in (i.e., have been removed from) sections of laser beam fiber 102 and aiming beam fiber 104, respectively. In some implementations, the section of laser beam fiber 102 from which coating 102a is removed and/or the section of aiming beam fiber 104 from which coating 104a is removed may have a length in a range from approximately 20 millimeters (mm) to approximately 200 mm.

In some implementations, coating 102a and/or coating 104a can be removed from laser beam fiber 102 or aiming beam fiber 104, respectively, using a window stripping process. Window stripping is a process by which a coating can be stripped from a section of optical fiber. Notably, window stripping does not require heat treatment or other perturbation to core 102c of laser beam fiber 120 and, therefore, laser beam fiber 102 (e.g., core 102c) is not negatively impacted as a result of window stripping.

As further shown, the section of a given aiming beam fiber 104 from which coating 104a is removed is in physical contact with the section of laser beam fiber 102 from which coating 102a is removed. As illustrated, the physical contact between the section of aiming beam fiber 104 from which coating 104a is removed (herein referred to as the section of aiming beam fiber 10) and the section of laser beam fiber 102 from which coating 102a is removed (herein referred to as the section of laser beam fiber 102) is physical contact between core 104b of aiming beam fiber 104 and cladding 102b of laser beam fiber 102. In some implementations, this physical contact may be provided by wrapping the section of aiming beam fiber 104 around the section of laser beam fiber 102, and applying tension to aiming beam fiber 104 (e.g., during or after the wrapping). In some implementations, the section of aiming beam fiber 104 is wrapped around the section of the laser beam fiber 102 such that the section of aiming beam fiber 104 completes ten or fewer revolutions around section of the laser beam fiber 102. The wrapping of the section of aiming beam fiber 104 around the section of laser beam fiber 102 (such that the section of aiming beam fiber 104 physically contacts the section of laser beam fiber 102) creates a side-coupling structure 100 that allows the aiming beam to be coupled from aiming beam fiber 104 to laser beam fiber 102.

In some implementations, a single aiming beam fiber 104 (with a section of coating 104a being removed) may be wrapped around the section of laser beam fiber 102, an example of which is shown and described below in association with FIG. 2A.

In some implementations, multiple (i.e., at least two) aiming beam fibers 104 (each with a section of a respective coating 104a being removed) may be wrapped around the section of laser beam fiber 102 (e.g., such that a core 104b of each aiming beam fiber 104 is in physical contact with cladding 102b of laser beam fiber 102), an example of which is described below in association with FIG. 2B. In some implementations, the inclusion of multiple aiming beam fibers 104 may result in increased coupled aiming beam power in side-coupling structure 100. Additionally, or alternatively, the inclusion of multiple aiming beam fibers 104 may permit back-reflection monitoring using side-coupling structure 100, an example of which is described below in association with FIG. 2C. Additionally, or alternatively, the inclusion of multiple aiming beam fibers 104 may permit multiple passing (e.g., double-passing) of an aiming beam through side-coupling structure 100, an example of which is described below in association with FIG. 2D.

As further shown in FIG. 1A, coating 106 (e.g., a low-index polymer coating) may surround side-coupling structure 100. In other words, coating 106 may surround the section of laser beam fiber 102 and the section of aiming beam fiber 104 (e.g., such that the section of aiming beam fiber 104 and the section of laser beam fiber 102 are recoated). Coating 106 may be applied to the section of aiming beam fiber 104 and the section of laser beam fiber 102 after the section of aiming beam fiber 104 is wrapped around the section of laser beam fiber 102. For example, in some implementations, side-coupling structure 100 may be placed in a tube 108 (e.g., a silica U-tube) (not shown in FIG. 1A), and tube 108 may be filled with a coating material in order to apply coating 106. In some implementations, a size (e.g., a thickness) of coating 106 may be in a range from approximately 600 μm to approximately 6 mm, such as 3 mm.

FIG. 1B is a diagram of an example cross section of side-coupling structure 100 at line 1B-1B shown in FIG. 1A. As shown in FIG. 1B, with the sections from which coating 102a and coating 104a have been removed, core 104b is in physical contact with cladding 102b, and cladding 102b and core 104b are surrounded by coating 106. Tube 108 in which side-coupling structure 100 may be arranged is shown in FIG. 1B.

FIG. 1C is a diagram of an example cross section of side-coupling structure 100 at line 1B-1B during operation. As shown in FIG. 1C, in operation, an aiming beam being transmitted by aiming beam fiber 104 may be coupled to laser beam fiber 102 (e.g., cladding 102b and/or core 102c) as the aiming beam propagates through side-coupling structure 100 (e.g., through the section of core 104b that is in physical contact with cladding 102b). Here, due to the physical contact between the section of aiming beam fiber 104 and the section of laser beam fiber 102, the aiming beam will be at least partially coupled to laser beam fiber 102 (e.g., such that the aiming beam is propagating through cladding 102b and/or core 102c at an end of side-coupling structure 100).

FIGS. 1A-1C are provided as examples for illustrative purposes, and other examples are possible. For example, the size, number, orientation, and arrangement of sections, layers, and components shown in FIGS. 1A-1C are provided as examples. In practice, side-coupling structure 100 may include additional sections, layers, and/or components; fewer sections, layers, and/or components; different sections, layers, and/or components; differently arranged sections, layers, and/or components; differently sized sections, layers, and/or components, and/or the like, than shown. For example, while not shown, in some implementations side-coupling structure 100 may include a cladding light stripper at or near an end (e.g., an input end or an output end) of laser beam fiber 102.

FIGS. 2A-2D are diagrams illustrating example laser systems including side-coupling structure 100.

Figure 2A:
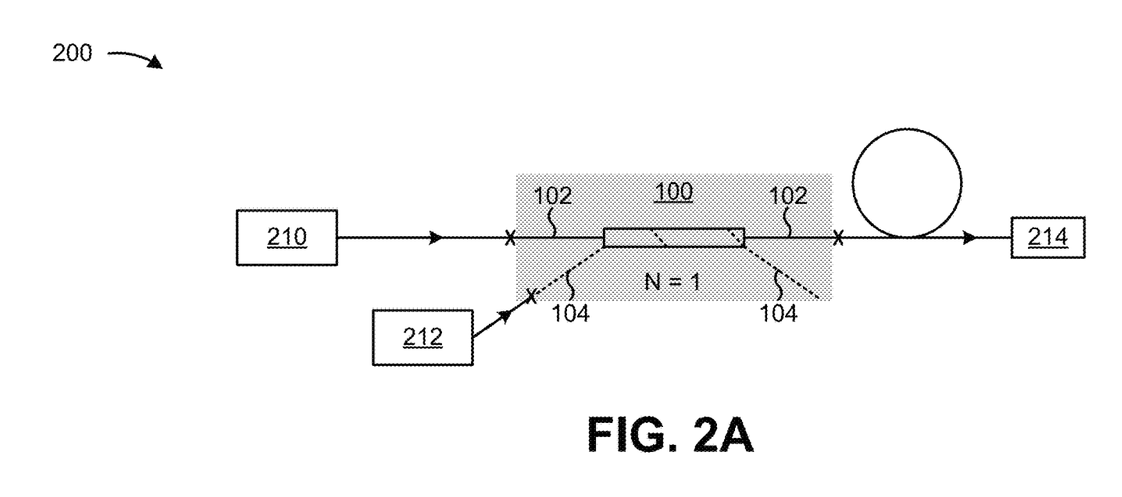
FIGS. 2A-2D are diagrams illustrating example laser systems including the side-coupling structure described herein.

FIG. 2A is a diagram of a laser system 200 comprising a side-coupling structure 100 that includes a single aiming beam fiber 104. As shown in FIG. 2A, laser system 200 may include side-coupling structure 100, a laser light source 210, an aiming light source 212, and an output cable 214. As indicated in FIG. 2A, in laser system 200, side-coupling structure 100 includes a single aiming beam fiber 104.

Laser light source 210 is a light source capable of providing a laser beam. For example, laser light source 210 can include a high-power fiber laser (e.g., a kW fiber laser), or another type of fiber laser, or free-space laser with a fiber-coupled output. In some implementations, laser light source 210 may include one or more components associated with generating, transmitting, and/or propagating the laser beam. For example, laser light source 210 may include a pump combiner, one or more high reflection fiber Bragg gratings (FBGs), one or more output couplers, one or more cladding light strippers, and/or the like. In some implementations, as shown in FIG. 2A, laser light source 210 may be arranged to provide a laser beam to an input end of laser beam fiber 102 of side-coupling structure 100 (e.g., a left end of laser beam fiber 102 in FIG. 2A).

Aiming light source 212 is a light source capable of providing an aiming beam (e.g., for coupling to the laser beam provided by laser light source 210). For example, aiming light source 212 can include a laser diode that provides light in the visible spectrum (e.g., red light, green light, blue light, and/or the like).

Output cable 214 is a component capable of propagating the laser beam provided by laser light source 210 and a portion of the aiming beam (e.g., a portion of the aiming beam that is coupled to laser beam fiber 102 provided by aiming light source 212). In some implementations, output cable 214 may be a component associated with providing a laser output (e.g., such that the laser output can be used in a material processing application). In some implementations, output cable 214 may include a tertiary fiber (e.g., a feeding fiber), a cladding light stripper, a connector (e.g., associated with connecting the tertiary fiber to a processing head), and/or the like.

As shown in FIG. 2A, side-coupling structure 100 can be spliced between laser light source 210, aiming light source 212, and output cable 214. For example, laser light source 210 can be spliced to an input end of laser beam fiber 102, output cable 214 can be spliced to an output end of laser beam fiber 102, and aiming light source 212 can be spliced to an input end of aiming beam fiber 104.

In operation, an aiming beam, provided by aiming light source 212, is transmitted by aiming beam fiber 104, and is coupled to laser beam fiber 102 (e.g., cladding 102b and/or core 102c) as the aiming beam propagates through side-coupling structure 100 (e.g., through the section of core 104b that is in physical contact with cladding 102b). Here, the physical contact between core 104b of aiming beam fiber 104 and cladding 102b of laser beam fiber 102 causes the aiming beam to be at least partially coupled to laser beam fiber 102. As a result, at the output end of side-coupling structure 100, at least a portion of the aiming beam is propagating through cladding 102b and/or core 102c, and will be coupled to output cable 214.

Figure 2B:
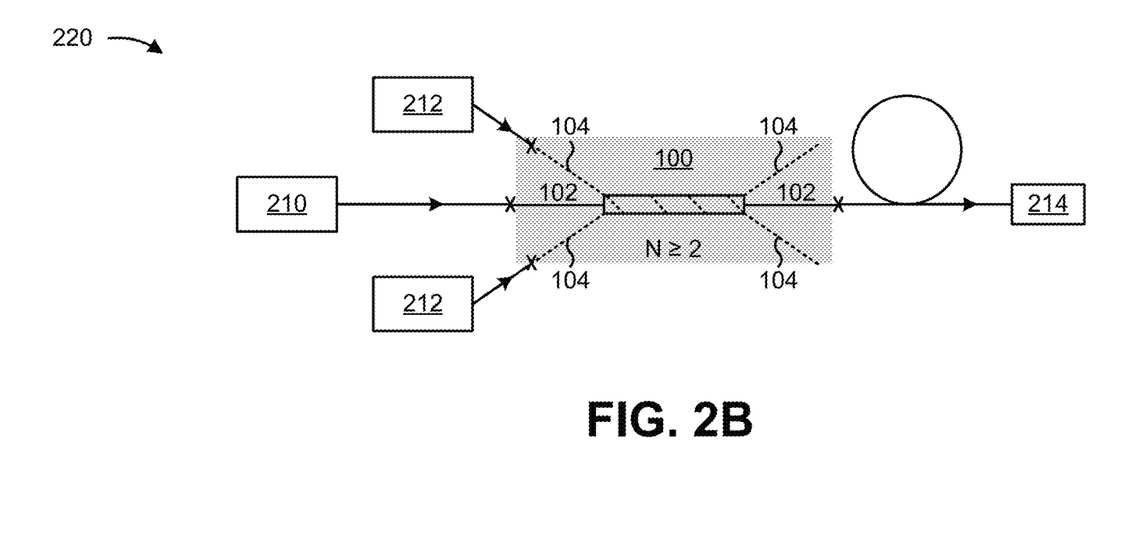

FIG. 2B is a diagram of a laser system 220 comprising a side-coupling structure 100 that includes multiple aiming beam fibers 104. Laser system 220 is similar to laser system 200 except that side-coupling structure 100 of laser system 200 includes at least two aiming beam fibers 104 and two aiming light sources 212. Laser system 220 may operate in a manner similar to that described above in association with FIG. 2A.

However, as compared to laser system 200, an amount of aiming beam power that is coupled to laser beam fiber 102 may be increased (e.g., as compared to an amount of coupled aiming beam power achieved in laser system 200) since side-coupling structure 100 includes multiple aiming beam fibers 104 and multiple aiming light sources 212. In some implementations, the increase in coupled aiming beam power may be proportional to the number of aiming beam fibers 104 and aiming light sources 212 included in side-coupling structure 100 (e.g., the amount of coupled aiming beam power increases as the number of aiming beam fibers 104 and aiming light sources 212 in side-coupling structure 100 increases).

Figure 2C:
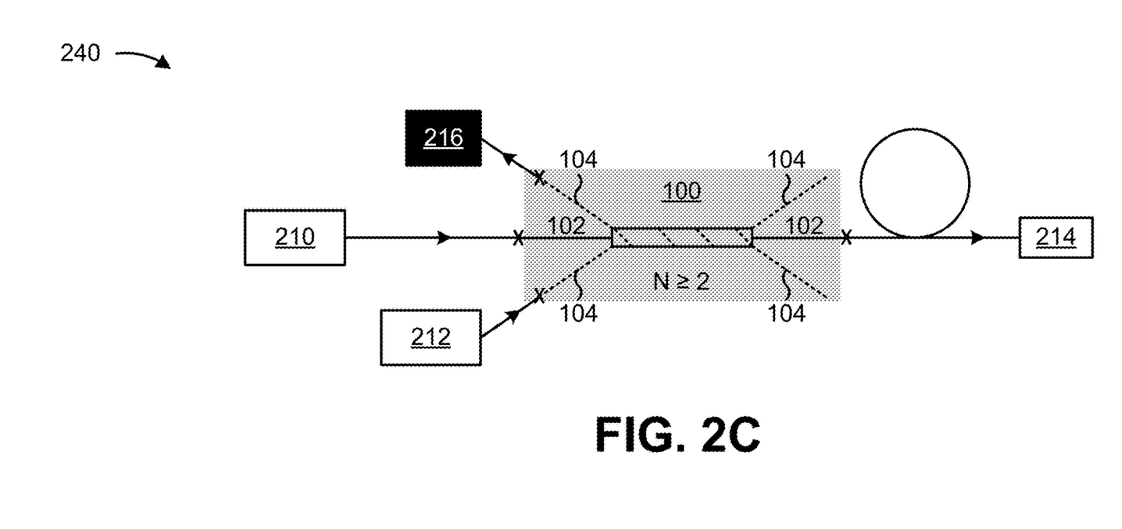

FIG. 2C is a diagram of a laser system 240 comprising a side-coupling structure 100 that includes multiple aiming beam fibers 104 in order to enable back-reflection monitoring using side-coupling structure 100. Laser system 240 is similar to laser system 220 except that laser system 240 includes a back reflection monitor 216.

Back reflection monitor 216 is a component capable of monitoring (e.g., measuring, detecting, determining, and/or the like) an amount of power reflected (e.g., by machining parts) back through laser system 240 in a direction from output cable 214 toward laser light source 210. In some implementations, back reflection monitoring is needed in order to ensure that an amount of power reflected back toward laser light source 210 is sufficiently low so as not to damage laser light source 210. As shown in FIG. 2C, back reflection monitor 216 may be spliced to an input end of aiming beam fiber 104 (e.g., an aiming beam fiber 104 other than that to which aiming light source 212 is spliced).

Figure 2D:
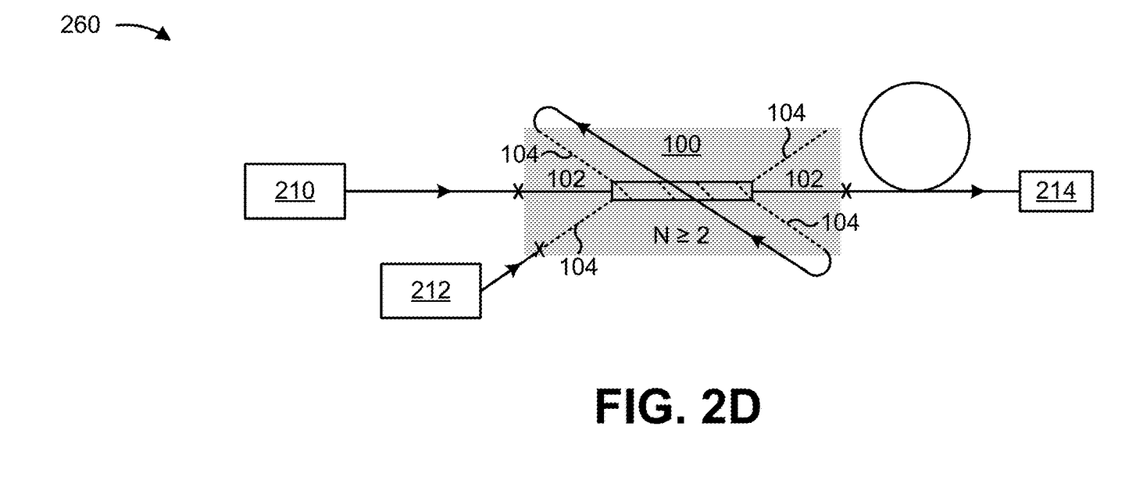

FIG. 2D is a diagram of a laser system 260 comprising a side-coupling structure 100 that includes multiple aiming beam fibers 104 in order to enable multiple passing of an aiming beam through side-coupling structure 100. As shown in FIG. 2D, an output end of a first aiming beam fiber 104 can be coupled to an input end of a second aiming beam fiber 104. Such an arrangement provides for double-passing of the aiming beam through side-coupling structure 100. In this way, a residual aiming beam (e.g., a portion of the aiming beam that remains in the first aiming beam fiber 104 after passing through side-coupling structure 100) passes through side-coupling structure 100 a second time, thereby increasing coupling efficiency. Additional aiming beam fibers 104 can be coupled in a similar manner (e.g., in order to enable more than two passes through side-coupling structure 100 and further increase coupling efficiency).

FIGS. 2A-2D are provided as examples for illustrative purposes, and other examples are possible. For example, the size, number, orientation, and arrangement of components shown in FIGS. 2A-2D are provided as examples. In practice, laser system 200, laser system 220, laser system 240, and/or laser system 260 may include additional components, fewer components, different components, differently arranged components, differently sized components, and/or the like, than shown.

Figure 3:
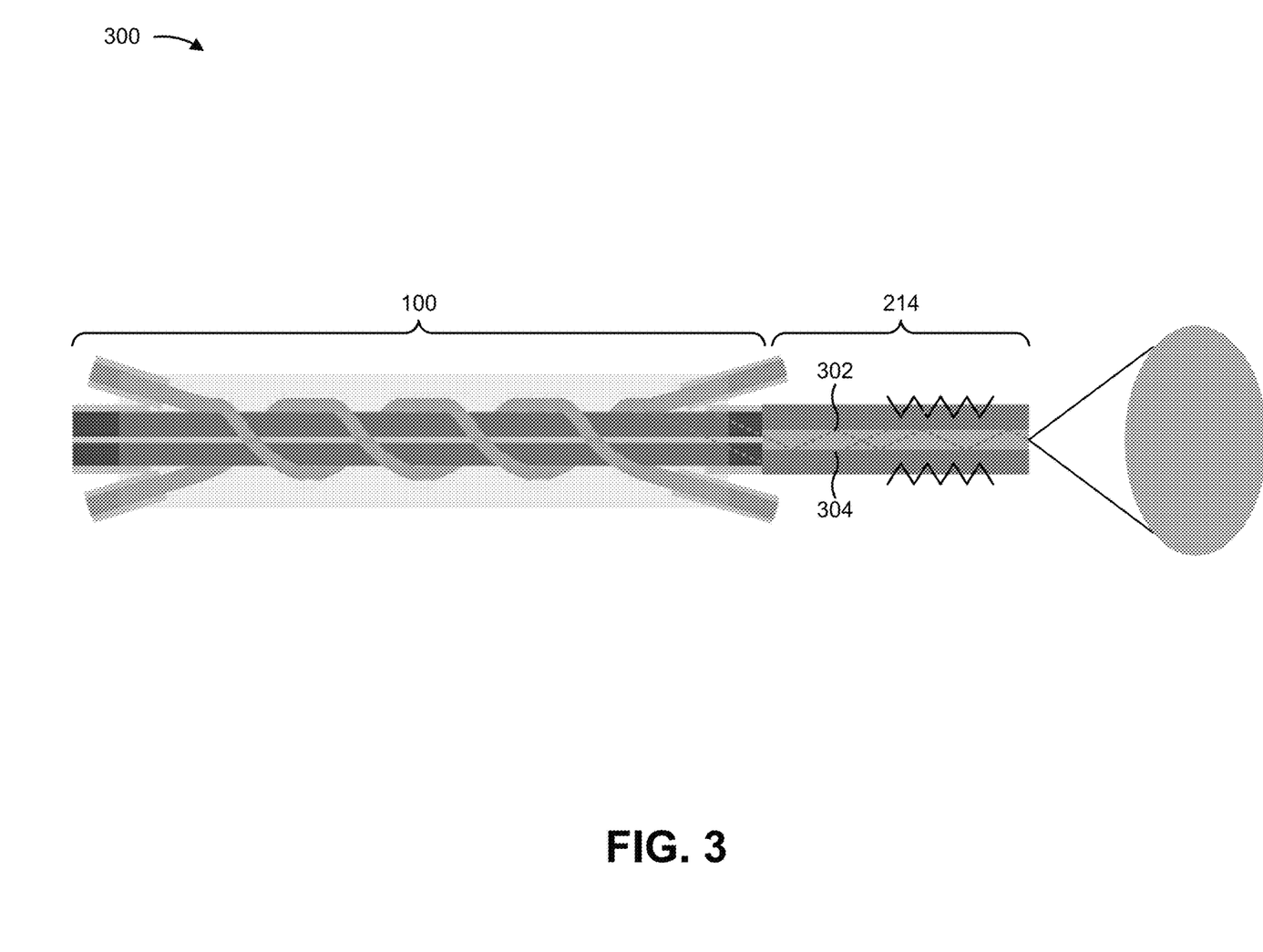
FIG. 3 is a diagram associated with a laser system in which cladding to core coupling can be achieved using the side-coupling structure described herein.

FIG. 3 is a diagram associated with a laser system 300 in which cladding to core coupling can be achieved using side-coupling structure 100 through splicing of dissimilar optical fibers.

In FIG. 3, an output end of laser beam fiber 102 is coupled to output cable 214 (e.g., a tertiary fiber, such as a feeding fiber). In some implementations, a characteristic of a core of laser beam fiber 102 may differ from a characteristic of a core of the tertiary fiber in order to cause a portion of the aiming beam that is coupled to laser beam fiber 102 to be confined to the core of the tertiary fiber. The characteristic that differs between core 102c and the core of the tertiary fiber may be, for example, a core size (e.g., diameter), a core numerical aperture (NA), a core refractive-index profile, and/or the like. In some implementations, the core size and/or the core NA of the tertiary are larger than the respective values for the core 102c.

As shown in FIG. 3, a first portion of the aiming beam (identified with reference number 302 in FIG. 3) and a second portion of the aiming beam (identified with reference number 304 in FIG. 3) may be propagating in cladding 102b of laser beam fiber 102. As further shown, due to the characteristic of core 102c being different from than that of the core of the tertiary fiber, the first portion of the aiming beam may be captured by the core of the tertiary fiber, while the second portion of the aiming beam is not. Here, the first portion of the aiming beam (i.e., the portion of the aiming beam now confined in the core of the tertiary fiber) remains through cladding stripper, while the second portion of the aiming beam (i.e., the portion of the aiming beam that is not confined to the core of the tertiary fiber) is at least partially removed.

FIG. 3 is provided as an example for illustrative purposes, and other examples are contemplated. For example, the size, number, orientation, and arrangement of components shown in FIG. 3 are provided as examples. In practice, laser system 300 may include additional components, fewer components, different components, differently arranged components, differently sized components, and/or the like, than shown.

Figure 4:
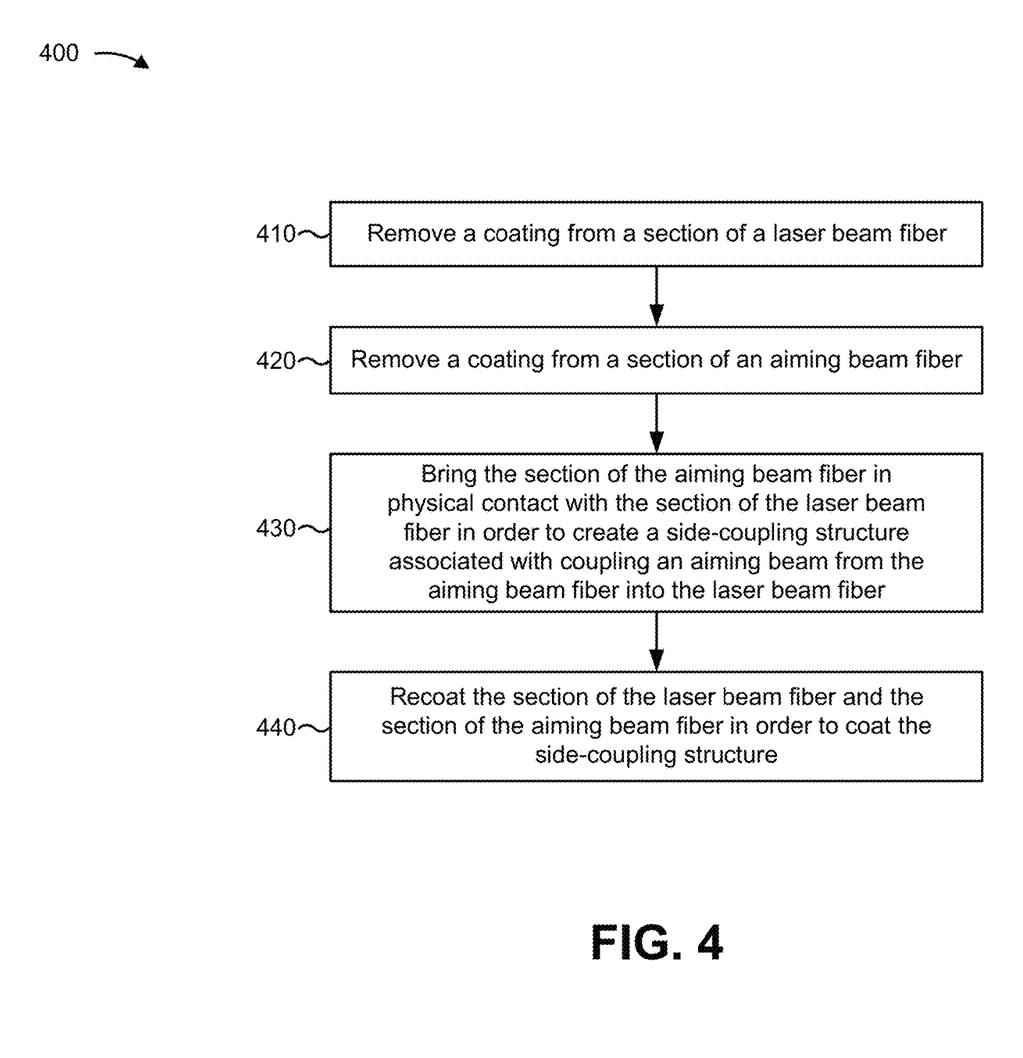
FIG. 4 is a flow chart of an example process for manufacturing the side-coupling structure described herein.

FIG. 4 is a flow chart of an example process 400 for manufacturing side-coupling structure 100 described above.

As shown in FIG. 4, process 400 may include removing a coating from a section of a laser beam fiber (block 410). For example, coating 102a may be removed from a section of laser beam fiber 102, as described above. In some implementations, the section of laser beam fiber 102 from which coating 102a is removed may have a length in a range from approximately 20 mm to approximately 200 mm. In some implementations, coating 102a may be removed from the section of laser beam fiber 102 using a window stripping process.

As further shown in FIG. 4, process 400 may include removing a coating from a section of an aiming beam fiber (block 420). For example, coating 104a may be removed from a section of aiming beam fiber 104, as described above. In some implementations, the section of aiming beam fiber 104 from which coating 104a is removed may have a length in a range from approximately 20 mm to approximately 200 mm. In some implementations, coating 104a may be removed from the section of aiming beam fiber 104 using a window stripping process.

As further shown in FIG. 4, process 400 may include bringing the section of the aiming beam fiber in physical contact with the section of the laser beam fiber in order to create a side-coupling structure associated with coupling an aiming beam from the aiming beam fiber into the laser beam fiber (block 430). For example, the section of aiming beam fiber 104 may be brought into physical contact with the section of laser beam fiber 102 in order to create side-coupling structure 100 associated with coupling an aiming beam from aiming beam fiber 104 into laser beam fiber 102.

In some implementations, this physical contact may be provided by wrapping the section of aiming beam fiber 104 around the section of laser beam fiber 102, and applying tension to aiming beam fiber 104 (e.g., during or after the wrapping). In some implementations, the section of aiming beam fiber 104 is wrapped around the section of the laser beam fiber 102 such that the section of aiming beam fiber 104 completes ten or fewer revolutions around the section of the laser beam fiber 102. In some implementations, the physical contact between the section of aiming beam fiber 104 and the section of laser beam fiber 102 is physical contact between core 104b of aiming beam fiber 104 and cladding 102b of laser beam fiber 102.

As further shown in FIG. 4, process 400 may include recoating the section of the laser beam fiber and the section of the aiming beam fiber in order to coat the side-coupling structure (block 440). For example, coating 106 may be applied to the section of laser beam fiber 102 and the section of aiming beam fiber 104 in order to coat side-coupling structure 100. In some implementations, coating 106 may be a low-index polymer coating. In some implementations, coating 106 may be applied to exposed portions of the section of aiming beam fiber 104 and the section of laser beam fiber 102 (e.g., portions of each section that are not in physical contact with one another). In some implementations, coating 106 may be applied over portions of coating 102a and/or coating 104a adjacent to an end of side-coupling structure 100.

Process 400 may include additional steps or implementations, such as any single step or implementation or any combination of steps or implementations described below and/or elsewhere herein.

In some implementations, aiming beam fiber 104 is a first aiming beam fiber 104, and process 500 may further include removing a coating from a section of a second aiming beam fiber 104, and bringing the section of second aiming beam fiber 104 in physical contact with the section of laser beam fiber 102. In some implementations, the inclusion of multiple aiming beam fibers 104 in side-coupling structure 100 may allow coupled aiming beam power in side-coupling structure 100 to be increased, may permit back-reflection monitoring using side-coupling structure 100, and/or may permit multiple passing (e.g., double-passing) of the aiming beam through side-coupling structure 100, as described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide side-coupling structure 100 associated with coupling an aiming beam from aiming beam fiber 104 into laser beam fiber 102, and a method of manufacturing side-coupling structure 100. As described above, side-coupling structure 100 is comparatively less complex and less difficult to manufacture than a free space optics approach for coupling an aiming beam and a laser beam and a fused fiber combiner approach for coupling an aiming beam and a laser beam, while improving optical performance.

The foregoing disclosure provides illustration and description, but is not intended to be exhaustive or to limit the implementations to the precise form disclosed. Modifications and variations may be made in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of manufacture, comprising:
   removing a coating from a section of a laser beam fiber;
   removing a coating from a section of an aiming beam fiber;
   bringing the section of the aiming beam fiber in physical contact with the section of the laser beam fiber in order to create a side-coupling structure associated with coupling an aiming beam from the aiming beam fiber into the laser beam fiber; and
   recoating the section of the laser beam fiber and the section of the aiming beam fiber in order to coat the side-coupling structure.

2. The method of claim 1, wherein bringing the section of the aiming beam fiber in physical contact with the section of the laser beam fiber comprises:
   wrapping the section of the aiming beam fiber around the section of the laser beam fiber; and
   applying tension to the aiming beam fiber during or after wrapping the section of the aiming beam fiber around the section of the laser beam fiber.

3. The method of claim 2, wherein the section of the aiming beam fiber is wrapped around the section of the laser beam fiber such that the section of the aiming beam fiber completes ten or fewer revolutions around the section of the laser beam fiber.

4. The method of claim 1, wherein the aiming beam fiber is a first aiming beam fiber, wherein the method further comprises:
removing a coating from a section of a second aiming beam fiber; and
bringing the section of the second aiming beam fiber in physical contact with the section of the laser beam fiber in order to at least one of:
increase coupled aiming beam power in the side-coupling structure,
permit back-reflection monitoring using the side-coupling structure, or
permit double-passing of the aiming beam through the side-coupling structure.

5. The method of claim 1, wherein the section of the laser beam fiber has a length in a range from 20 millimeters (mm) to approximately 200 mm.

6. The method of claim 1, wherein window stripping is used to remove the coating from the section of the laser beam fiber or to remove the coating from the section of the aiming beam fiber.

7. The method of claim 1, wherein the physical contact between the section of the aiming beam fiber and the section of the laser beam fiber is physical contact between a cladding of the aiming beam fiber and a cladding of the laser beam fiber.

8. The method of claim 1, wherein the aiming beam fiber comprises a glass core and a low-index polymer coating.

9. The method of claim 1, wherein the section of the laser beam fiber and the section of the aiming beam fiber are recoated with a low-index polymer coating.

10. The method of claim 1, wherein the laser beam fiber is a double-clad fiber comprising a core to transmit laser light, a cladding, and the coating, wherein the coating removed from the section of the laser beam fiber is a low-index polymer coating.

11. An optical coupler, comprising:
a primary fiber including a primary window stripped section;
a secondary fiber including a secondary window stripped section,
wherein the secondary window stripped section is in physical contact with the primary window stripped section in order to create a side-coupling structure for coupling a secondary beam, associated with the secondary fiber, to the primary fiber; and
a coating surrounding the primary window stripped section and the secondary window stripped section.

12. The optical coupler of claim 11, wherein an input of the secondary fiber is coupled to a source that provides the secondary beam.

13. The optical coupler of claim 11, wherein the optical coupler further comprises:
another secondary fiber including another secondary window stripped section,
wherein the other secondary window stripped section is in physical contact with the primary window stripped section in order to create the side-coupling structure.

14. The optical coupler of claim 13, wherein an input of the other secondary fiber is coupled to a back reflection monitor associated with monitoring back reflection of a primary beam associated with the primary fiber.

15. The optical coupler of claim 13, wherein an output of the secondary fiber is coupled to an input of the other secondary fiber in order to provide double-passing of the secondary beam through the optical coupler.

16. The optical coupler of claim 11, wherein an output end of the primary fiber is coupled to a tertiary fiber, wherein a characteristic of a core of the primary fiber differs from a characteristic of a core of the tertiary fiber in order to cause a portion of the secondary beam to be confined to the core of the tertiary fiber.

17. The optical coupler of claim 11, wherein an output end of the primary fiber is coupled to a tertiary fiber, wherein the tertiary fiber includes a cladding stripper to at least partially remove a portion of the secondary beam that is not confined to a core of the tertiary fiber.

18. The optical coupler of claim 11, wherein an output end of the primary fiber is coupled to a tertiary fiber, and wherein at least one of:

a size of a core of the tertiary fiber is larger than a size of a core of the primary fiber; or
a numerical aperture (NA) of the tertiary fiber is larger than an NA of the primary fiber.

19. The optical coupler of claim 11, wherein the secondary beam is in a visible spectrum.

20. The optical coupler of claim 11, wherein the primary fiber is to receive a high-power beam associated with a material processing application.

21. The optical coupler of claim 11, wherein the physical contact between the section of the secondary fiber and the section of the primary fiber is physical contact between a core of the secondary fiber and a cladding of the primary fiber.

22. An optical coupler, comprising:
a first fiber for a laser beam,
wherein the first fiber includes a first coating surrounding a first cladding surrounding a first core, and
wherein the first fiber includes a first section with the first coating removed;
a second fiber for an aiming beam,
wherein the second fiber includes a second coating surrounding a second core,
wherein the second fiber includes a second section with the second coating removed, and
wherein the second section is in physical contact with the first section for coupling the aiming beam from the second fiber into the first fiber; and
a third coating surrounding the first section and the second section,
wherein the third coating surrounds segments of the first coating adjacent to ends of the first section and segments of the second coating adjacent to ends of the second section.

* * * * *